United States Patent [19]
Horikawa et al.

[11] Patent Number: 4,572,461
[45] Date of Patent: Feb. 25, 1986

[54] MAGNETIC TAPE CASSETTE

[75] Inventors: Kenichi Horikawa, Tokyo; Yoshinori Yamamoto; Kenji Kawakami, both of Kanagawa, all of Japan

[73] Assignee: Sony Corporation, Tokyo, Japan

[21] Appl. No.: 678,813

[22] Filed: Dec. 6, 1984

[30] Foreign Application Priority Data

Dec. 22, 1983 [JP] Japan .................................. 58-242542

[51] Int. Cl.[4] .................... G03B 1/04; G11B 15/32; G11B 23/04
[52] U.S. Cl. .................................. 242/198; 360/132
[58] Field of Search ............... 242/192, 197–200; 360/93, 96.1, 95, 96.6, 132, 137

[56] References Cited

U.S. PATENT DOCUMENTS

| | | | |
|---|---|---|---|
| 4,331,988 | 5/1982 | Kawai | 360/96.6 |
| 4,372,504 | 2/1983 | Shibata et al. | 242/198 |
| 4,452,407 | 6/1984 | Ogata et al. | 242/198 |
| 4,472,753 | 9/1984 | Wolfing | 360/132 |

*Primary Examiner*—Leonard D. Christian
*Attorney, Agent, or Firm*—Hill, Van Santen, Steadman & Simpson

[57] ABSTRACT

The present invention relates to a cassette casing for a magnetic tape cassette, in which particularly when not in operation for recording and/or reproducing a signal, the cassette casing is tightly closed to protect a magnetic tape from being adhered with dusts and touching of fingers. The cassette casing is provided at its front portion with an openable and closable lid and at its lower surface with a slidable slider, whereby upon non-use, reel shaft insertion apertures, a front opening and a cut-out portion are closed by the front lid and the slider and this closed state is held by the cooperation of the front lid and the slider. Also, an elastic engaging piece member having at its tip end a protrusion is formed near the cut-out portion of the cassette casing and an engaging aperture which is engaged with this protrusion is formed through the slide, whereby the sliding movement of the slider is restricted by the engagement between the engaging piece member and the engaging aperture.

3 Claims, 17 Drawing Figures

MAGNETIC TAPE CASSETTE

BACKGROUND OF THE INVENTION

1. Field of the Invention

This invention relates to a magnetic tape cassette and, more particularly, relates to a magnetic tape cassette suitable for use for recording a digital signal, for example, a PCM (pulse-code modulated) signal.

2. Description of the Prior Art

At present, a PCM recording and reproducing apparatus has been proposed in which an analog signal such as an audio signal or the like is converted into a digital signal, for example, a PCM signal and then recorded on (or reproduced from) a magnetic tape. In the known PCM recording and reproducing apparatus, there is such one which uses a rotary head to make a relatively high recording density. In such PCM recording and reproducing apparatus having the rotary head, upon recording (or reproducing), a magnetic tape is drawn out from the tape cassette, wound around the rotary drum in which the rotary head is provided, and then the recording (or reproducing) is carried out.

In the tape cassette incorporating therein such magnetic tape, if oil component such as fingerprints or the like and dusts adhere to the magnetic tape, a dropout is caused in the reproduced signal. So, in order to prevent the oil component such as fingerprints or the like and dusts from adhering to the magnetic tape, the magnetic tape has to be held in a closed state as tightly as possible. Moreover, it is necessary to provide a space in front of the tape cassette through which a tape guide system is inserted into the tape cassette for drawing out the magnetic tape from the tape cassette upon recording (or reproducing).

Therefore, such a tape cassette as shown in FIGS. 1 and 2 is proposed. In FIGS. 1 and 2, reference numeral generally designates a cassette casing and this cassette casing 1 consists of a pair of an upper half 2 and a lower half 3 which are formed integral by screw bolts (not shown). Reference numeral 2a designates a transparent window plate provided on the upper surface portion of the upper half 2. Reference numerals 4a and 4b designate a pair of reel hubs which are incorporated into the cassette casing 1 and rotatably engaged with a pair of reel shaft insertion apertures 5a and 5b which are formed through the lower half 3 at its predetermined positions. A magnetic tape 6 is wound around the pair of reel hubs 4a and 4b. Reference numerals 7a and 7b respectively designate tape guide columns which are planted on the lower half 3 facing the front portion of the tape cassette near the right and left side wall portions. The magnetic tape 6 is stretched between and in contact with the tape guide columns 7a and 7b so as to be capable of running at a predetermined position of the front portion of the tape cassette. Reference numeral 3a designates a cut-out portion formed through the lower half 3 over a predetermined width in a rectangular shape at the portion opposing the rear surface of the magnetic tape 6 stretched between the tape guide columns 7a and 7b. Upon recording (or reproducing), inserted into this cut-out portion 3a is a tape guide system which is adapted to draw out the magnetic tape 6 and provided in the recording and reproducing apparatus though not shown.

Reference numeral 8 designates a front lid which is rotatably pivoted to the cassette casing 1 at its front side through its arm portions 8a and 8b which are formed at the both sides thereof. This front lid 8 is adapted to open and/or close the front portion of the cassette casing 1.

Reference numeral 9 designates a slider or sliding member of nearly U-shape which is provided such that it can be slidably moved back and forth in opposing relation to the lower surface and right and left side wall portions of the lower half 3. Reference numerals 9a and 9b respectively designate reel shaft insertion corresponding apertures which are bored through the sliding member 9 at such positions that when the sliding member 9 is slidably moved backward so as to expose the cut-out portion 3a, they correspond to the reel shaft insertion apertures 5a and 5b, respectively. Reference numerals 10a and 10b respectively designate positioning holes which are formed from the lower surface portion of the lower half 3 in correspondence with the tape guide columns 7a and 7b.

In such magnetic tape cassette, upon non-use, as shown in FIG. 1, the front portion of the cassette casing 1 is closed by the front lid 8 and the sliding member 9 is slidably moved forward so that the cut-out portion 3a, the reel shaft insertion apertures 5a, 5b and the positioning holes 10a, 10b are closed by the sliding member 9, thus the magnetic tape 6 being tightly shielded within the cassette casing 1.

Upon use, as shown in FIG. 2, the sliding member 9 is slidably moved backward to open the cut-out portion 3a, the reel shaft insertion apertures 5a, 5b and the positioning holes 10a, 10b. And, the front lid 8 is rotated upward to expose the magnetic tape 6 at the front portion of the cassette casing 1 and the tape guide system, the reel shafts and the positioning protrusions are respectively inserted into the cut-out portion 3a, the reel shaft insertion apertures 5a, 5b and the positioning holes 10a, 10b so that the magnetic tape 6 is drawn forward from the front portion of the cassette casing 1 by the tape guide system and loaded onto the rotary drum so as to carry out the predetermined recording (or reproducing).

By the way, the magnetic tape 6 loaded in such magnetic tape cassette is opposed at its magnetic surface to the front lid 8. Therefore, it is desired that upon non-use, the front lid 8 can be prevented from being rotated unintentionally so as not to open the front portion of the cassette casing 1 by a simple operation.

OBJECTS AND SUMMARY OF THE INVENTION

Accordingly, it is an object of this invention to provide an improved magnetic tape cassette.

It is another object of this invention to provide a lidded magnetic tape cassette in which, when the front lid thereof is rotated, a bad influence can be prevented from being exerted upon a magnetic tape.

It is a further object of this invention to provide a lidded magnetic tape cassette, in which when not in operation, the front lid thereof can be prevented from being rotated so as not to open a front opening of a cassette casing by a simple operation.

It is yet a further object of this invention to provide a magnetic tape cassette suitable for recording and reproducing a digital signal, for example, a PCM (pulse code modulated) signal.

According to one aspect of this invention, there is provided a magnetic tape cassette comprising:

(a) a cassette casing having incorporated therein a pair of reel hubs around which a magnetic tape is wound;

(b) a rotatable front lid provided at a front portion of said cassette casing and covering an opening formed through said front portion of said cassette casing; and (c) a sliding plate provided at one surface of said cassette casing so as to be freely slidable in the front and rear direction, wherein when said sliding plate is slidably moved to a first sliding position, a pair of reel shaft insertion apertures into which said pair of reel hubs are rotatably inserted and a cut-out portion for drawing forward said magnetic tape are exposed, while when said sliding plate is slidably moved to a second sliding position, said reel shaft insertion apertures and said cut-out portion are closed, said front openable and closable lid having at its both side end portions arm portions having rotary shafts, in which when said sliding plate is at said second sliding position, a closed state of said front openable and closable lid is restricted by the cooperation of a front end portion of said sliding plate with said arm members, said cut-out portion of said cassette casing having a resilient engaging piece member having at its tip end a protrusion extended in the front surface direction and said sliding plate having formed therethrough an engaging aperture with which said protrusion of said engaging piece member is engaged under the state that said cut-out portion is closed by said sliding plate, whereby to restrict the sliding operation of said sliding plate.

The other objects, features and advantages of the present invention will become apparent from the following description taken in conjunction with the accompanying drawings through which the like references designate the same elements and parts.

DESCRIPTION OF THE PREFERRED EMBODIMENTS

Figure 1:
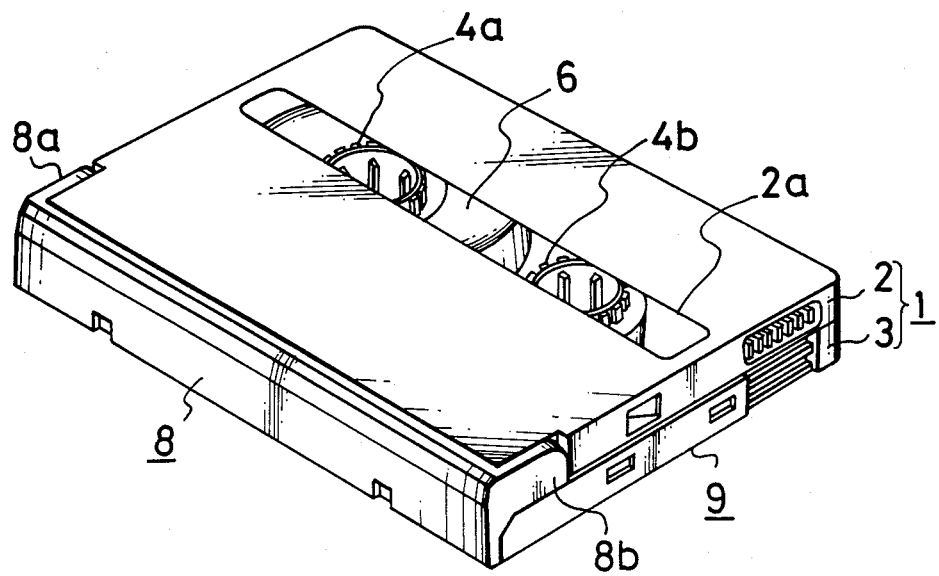
FIG. 1 is a perspective view showing an example of a prior art tape cassette having a rotatable front lid and a slidable slider.
Figure 2:
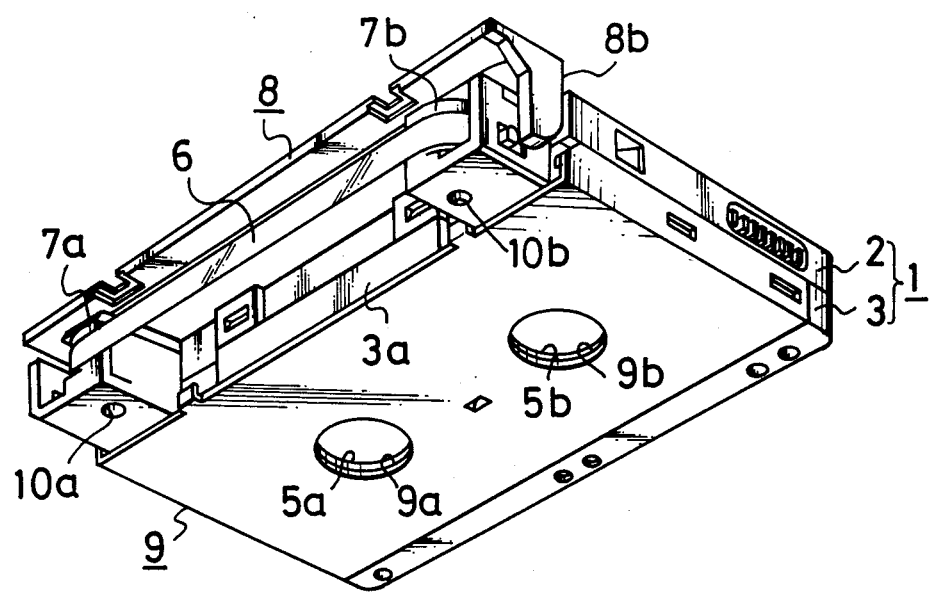
FIG. 2 is a perspective view showing the prior art tape cassette shown in FIG. 1 in which the front lid thereof is rotated in the upper direction and the slider is slid backwards.

Now, an embodiment of a magnetic tape cassette according to the present invention will hereinafter be described with reference to FIGS. 3 to 14. In FIGS. 3 to 14, like parts corresponding to those in FIGS. 1 and 2 are marked with the same references and will not be described in detail.

Figure 3:
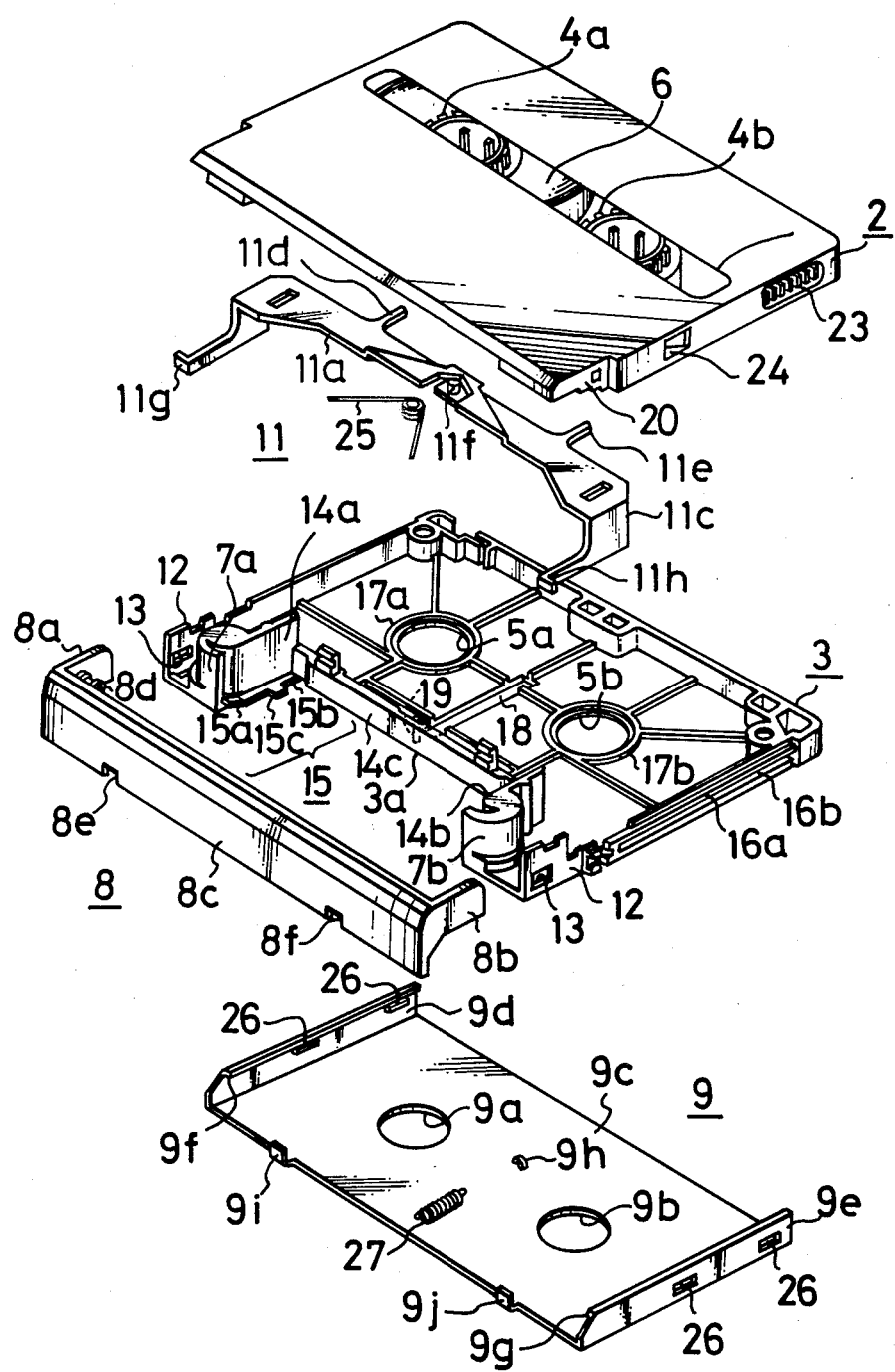
FIG. 3 is an exploded perspective view of an embodiment of a magnetic tape cassette according to the present invention.

In FIG. 3, reference numerals 2 and 3 designate the upper half and the lower half, respectively. These upper half 2 and lower half 3 are made of synthetic resin, for example, ABS resin and the front lid 8, the sliding member 9 and a reel brake member 11, which will be described later, are respectively disposed at predetermined positions of the upper half 2 and the lower half 3, thus the magnetic tape cassette being formed.

Figure 4:
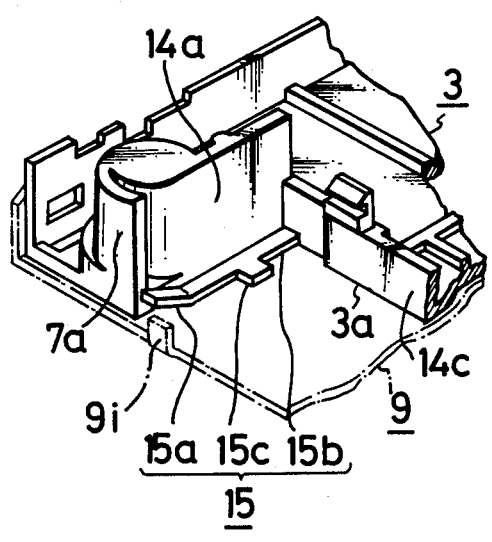
FIG. 4 is an enlarged perspective view showing a main part of the magnetic tape cassette shown in FIG. 3.

The lower half 3 will be described with reference to FIGS. 3 and 4. This lower half 3 is formed of a flat plate portion of substantially rectangular shape, through which the reel shaft insertion apertures 5a and 5b are formed, and a frame portion which is formed of right and left side wall portions except the front surface portion at which the front lid 8 is disposed and a rear surface wall portion. In this case, the right and left side wall portions and the lower surface portion of the lower half 3 except the slidable range of the sliding member 9 are formed thick by the thickness of the sliding member 9, whereby the right and left side wall portions and the lower surface portion of the lower half 3 corresponding to the slidable range of the sliding member 9 are stepped so that when the sliding member 9 is engaged with the lower half 3, there is caused no step between the lower half 3 and the sliding member 9. The right and left side wall portions of the lower half 3 near the front portion thereof are stepped inwardly to have steps corresponding to the thicknesses of the arm portions 8a, 8b of the front lid 8 thereby to form support walls 12, 12. Formed through these support walls 12, 12 are shaft apertures to rotatably pivot the rotary shafts of the front lid 8 as will be described later. And, operating member insertion apertures 13, 13 of rectangular shape are formed through the support walls 12, 12 at the position at which when the front lid 8 is rotated upwards, the lower portions of the rear surface portions of the arm portions 8a, 8b of the front lid 8 cover the support walls 12, 12, namely, at the positions of the front surface portions of the support walls 12, 12 near the lower ends thereof.

Shield walls 14a, 14b and 14c are respectively formed at the right and left side portions and rear surface portion of the cut-out portion 3a, whereby the inside of the cassette casing 1 is shielded from the cut-out portion 3a.

In this embodiment, an elastic engaging piece member 15 is formed near the left-hand side portion of the shield wall 14c which is formed on the rear surface side of the cut-out portion 3a. In this case, particularly as shown in FIG. 4, the engaging piece member 15 is formed of a plate portion 15b having elasticity in the direction parallel to the front and rear direction and a slope portion 15a having its tip end side bent upward obliquely so as to obliquely oppose the cut-out portion of the front lid 8, which will be described a later, and a protruded portion 15c positioned at the intermediate position of the front and rear direction of the plate portion 15b and protruded to the right-hand side thereof so as to be formed as substantially T-shaped as seen from the vertical direction. It is desired that the engaging piece member 15 is formed integral with the lower half 3 so as to prevent the number of assembly parts from being increased.

Further, formed on the upper edge portions of the right and left side wall portions of the lower half 3 are lateral grooves 16a, 16a which are parallel to the front to back direction, respectively. Formed beneath the lateral grooves 16a, 16a are slide guide grooves 16b, 16b of rectangular shape in correspondence with the slidable range of the sliding member 9. In this case, the depths of the lateral grooves 16a, 16a and the slidable guide grooves 16b, 16b are selected to be smaller than the thicknesses of the arm portions 8a, 8b of the front lid 8.

Reference numerals 17a, 17b respectively designate collar or flange portions of annular shape formed around the pair of reel shaft insertion apertures 5a, 5b. Reference numeral 18 designates a spring incorporating portion of rectangular shape formed at the intermediate position between the reel shaft insertion apertures 5a and 5b in parallel to the front and rear direction. Reference numeral 19 designates a spring engaging column member which is planted near the front surface portion side of the spring incorporating portion 18. Incorporated within the spring incorporating portion 18 is a coil spring for biasing the sliding member 9 as will be described later. This coil spring is engaged at its one end with the spring engaging column member 19.

Figure 5:
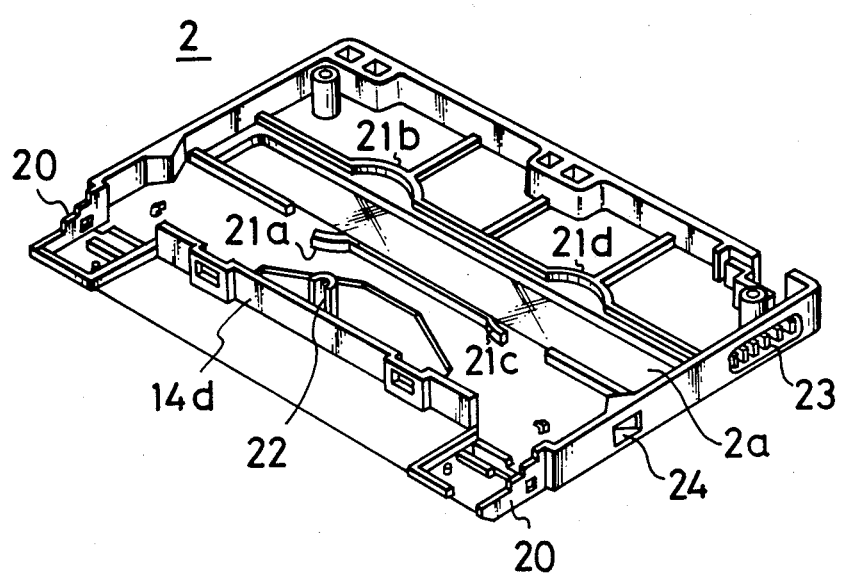
FIG. 5 is a perspective view showing the inside of the upper half of the magnetic tape cassette shown in FIG. 3.

Next, the upper half 2 will be described with reference to FIGS. 3 and 5. Similarly to the lower half 3, this upper half 2 is formed of a flat plate portion of substantially rectangular shape through which the transparent window plate 2a is formed and a frame portion which is formed of the right and left side wall portions and the rear surface wall portion except the front surface portion in which the front lid 8 is disposed. In this case, the outer dimension of the upper half 2 is selected to be substantially the same as that of the lower half 3 when it is assembled with the sliding member 9, so that when they are assembled, no step is caused among the upper half 2, the lower half 3 and the sliding member 9. Reference numerals 20, 20 respectively designate support walls formed such that the portions of the right and left side wall portions near the front portion of the cassette casing 1 are respectively stepped inwardly by the thicknesses of the arm portions 8a, 8b of the front lid 8 in correspondence with the support walls 12, 12 of the lower half 3. The shape of the abutting portions of the support walls 20, 20 and that of the abutting portions of the support walls 12, 12 of the lower half 3 are made complementary to each other. Reference numeral 14d designates a shield wall which is formed in correspondence with the shield wall 14c formed at the rear portion side of the cut-out portion 3a of the lower half 3. When the upper half 2 and the lower half 3 are coupled to each other to be integral, the shield wall 14d of the upper half 2 and the shield wall 14c of the lower half 3 abut with each other to thereby shield the inside of the cassette casing 1 from the cut-out portion 3a. Reference numerals 21a, 21b, 21c and 21d respectively designate collar or flange portions of arc shape which are formed so as to correspond to the annular collar portions 17a, 17b formed on the lower half 3. By the cooperation of the collar portions 21a, 21b and 21c, 21d of the upper half 2 with the collar portions 17a, 17b of the lower half 3, the reel hubs 4a and 4b around which the magnetic tape 6 is wound are respectively supported so as to be able to rotate. In this case, the heights of the collar portions 21a, 21b, 21c and 21d are selected to be substantially the same as the thickness of the portions of a reel brake member 11, which will be described later, and which portions are along the upper half 2 so that the reel brake member 11 is prevented from being protruded beyond the collar portions 21a, 21b, 21c and 21d, thus the magnetic tape 6 which is wound around the pair of reel hubs 4a, 4b being protected from a bad influence. Reference numeral 22 designates a spring fixing boss of U-shape which is formed in correspondence with the spring engaging column member 19 formed on the lower half 3. When the upper half 2 and the lower half 3 are coupled integral to each other, the spring engaging column member 19 is located within the opening portion of the spring fixing boss 22 and hence one end of the coil spring for biasing to be engaged with the spring engaging column member 19 as will be described later is fixed by the end portion of this spring fixing boss 22. Reference numerals 23, 23 respectively designate concave and convex portions which are formed on the right and left side wall portions near the rear surface portion for preventing any sliding of the cassette casing 1. Reference numerals 24, 24 respectively designate support concave portions of substantially V-shape in cross section which are formed at nearly the central portions of the right and left side wall portions. When the tape cassette is loaded on the recording and reproducing apparatus, the support concave portions 24, 24 are held by support nails (not shown) from both right and left directions.

The reel brake member 11 will be described with reference to FIG. 3. The reel brake member 11 is formed of a slide guide plate 11a which is along the inner bottom surface of the upper half 2 and arms 11b, 11c of L-shape which are respectively extended downward and perpendicularly from the both left and right end portions of the slide guide plate 11a. In this case, brake nail members 11d and 11e corresponding to the pair of reel hubs 4a, 4b are formed at the rear surface portion side of the slide guide plate 11a. In correspondence with the brake nail members 11d and 11e, ratchet wheels are formed on the outer peripheral portions of the reel hubs 4a, 4b at the side of the upper half 2.

Further, a spring engaging portion 11f is provided at the central portion of the slide guide plate 11a, and operating members 11g, 11h are respectively formed on the end portions of the arms 11b and 11c. In this case, a spring 25 which is used to bias the reel brake member 11 is engaged with the spring engaging portion 11f and the free ends of this spring 25 urges the shield wall 14d of the upper half 2 so that the brake nail members 11d, 11e are engaged with the ratchet wheels formed on the outer peripheral portions of the reel hubs 4a, 4b by the biasing force of the spring 25, whereby the pair of reel hubs 4a, 4b are locked so as not to be rotated. Moreover, when the reel brake member 11 is disposed within the cassette casing 1, the end portions of the operating members 11g, 11h are respectively protruded through the operating member insertion apertures 13, 13 of the lower half 3 to the outsides of the support walls 12, 12 by a predetermined amount. Accordingly, when the front lid 8 is rotated upwards, the operating members 11g, 11h thus protruded are urged by the end portions of the arm portions 8a, 8b of the front lid 8, the reel brake member 11 is slid forwards against the biasing force of the spring 25, hence the brake nail members 11d, 11e are disengaged from the ratchet wheels of the reel hubs 4a, 4b and then the pair of reel hubs 4a, 4b become rotatable.

The front lid 8 will further be described with reference to FIG. 3. This front lid 8 is formed of a plate portion 8c which closes the front portion of the cassette casing 1 and the arm portions 8a, 8b provided at both side end portions of the plate portion 8c so as to oppose to each other to be of substantially U-shape viewed from above. In this case, when the front lid 8 is rotated at the position to close the front portion of the cassette casing 1, the arm portions 8a, 8b of the front lid 8 covers the right and left side support walls 20, 20 of the upper half 2 so that when the front lid 8 is at this rotation position, the sliding member 9 can be located under the arm portions 8a, 8b. Further, rotary shafts 8d, 8d are provided at substantially the central positions on the inner surfaces of the arm portions 8a, 8b.

In this embodiment, a cut-away portion 8e of U-shape is formed through the lower edge portion of the plate portion 8c in correspondence with the plate portion 15b of the engaging piece member 15 formed on the lower half 3, while a cut-away portion 8f of U-shape is formed through the lower edge portion of the plate portion 8c at the position symmetrical to the cut-away portion 8e in the right and left direction.

Figure 6:
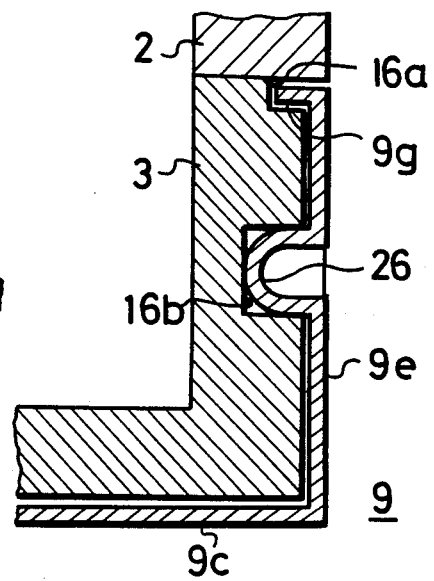
FIG. 6 is a cross-sectional view useful for explaining the slider of the magnetic tape cassette shown in FIG. 3.

The sliding member 9 will be described more fully with reference to FIGS. 3 and 6. This sliding member 9 is formed of a flat plate portion 9c which is along the lower surface portion of the lower half 3 and side plate portions 9d, 9e which are located at the both right and left sides of the flat plate portion 9c and along the right and left side wall portions of the lower half 3 so as to be substantially U-shape as seen from the front and rear direction. Reference numerals 9f and 9g respectively designate bent portions which are provided by bending the upper edge portions of the side plate portions 9d, 9e inwardly to a hook shape. The bent portions 9f, 9g are located within the lateral grooves 16a, 16a when the sliding member 9 is assembled to the cassette casing 1 as shown in FIG. 6.

Further, in correspondence with the slide guide grooves 16b, 16b of the lower half 3, projected portions 26, 26 are formed at the left and right side plate portions 9d and 9e at their predetermined positions which protrude to the side of the cassette casing 1. The projected portions 26, 26 at the side of the cassette casing 1 are formed as smooth curved surfaces so as to make the contact angles with the slide guide grooves 16b,16b become obtuse angles as shown in FIG. 6. Thus, the contacts of the top surfaces of the projected portions 26, 26 with the bottom surfaces of the slide guide grooves 16b, 16b make the positioning of the sliding member 9 in the left and right direction of the cassette casing 1, while the contacts of the upper and lower side portions of the top portions of the projected portions 26, 26 with the side surface portions of the slide guide grooves 16b, 16b make the positioning of the sliding member 9 in the vertical direction of the cassette casing 1.

Reference numeral 9h designates a spring engaging piece member which is formed on the flat plate portion 9c in correspondence with the spring incorporating portion 18 of the lower half 3. Reference numeral 27 designates a tension coil spring which is adapted to bias the sliding member 9. One end of this tension coil spring 27 is engaged with the spring engaging column member 19 of the lower half 3 and the other end thereof is engaged with the spring engaging piece member 9h with the result that the sliding member 9 is biased forwards to close the cut-out portion 3a.

In this embodiment, an engaging portion 9i is perpendicularly erected on the front end portion of the flat plate portion 9c in correspondence with the protruded portion 15c of the engaging piece member 15 formed on the lower half 3, while a contact piece member 9j is perpendicularly erected on the front end portion of the flat plate portion 9c in correspondence with the cutaway portion 8f formed in the right-hand side of the front lid 8.

Other engaging portions may be formed similarly to the tape cassette shown in FIGS. 1 and 2.

The operation of the magnetic tape cassette thus made will be described with reference to FIGS. 7 to 14.

Figure 7:
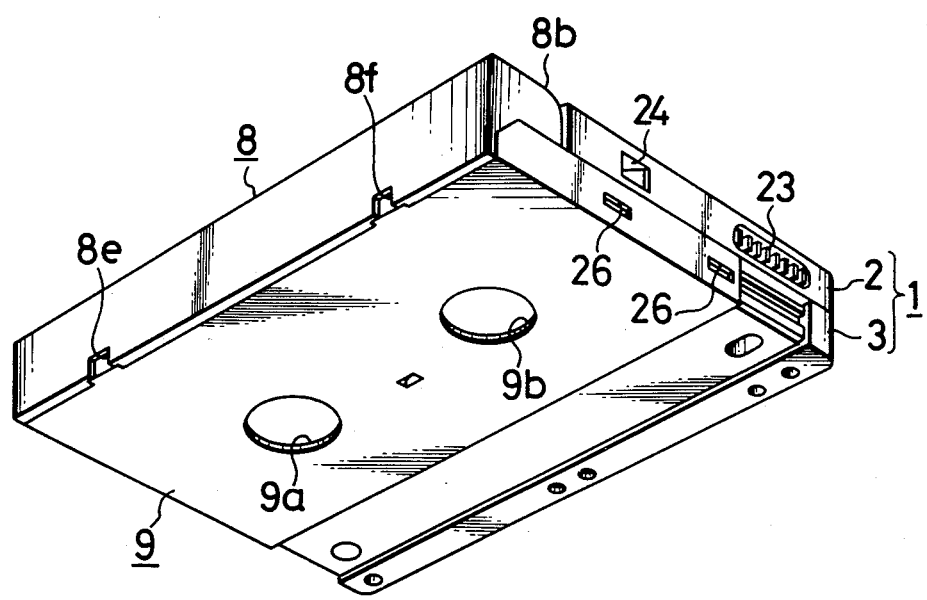
FIG. 7 is a perspective view showing the magnetic tape cassette of FIG. 3 upon non-use.
Figure 8:
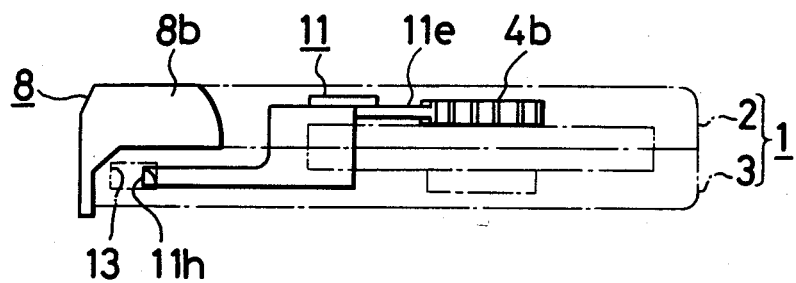
FIG. 8 is a schematic diagram useful for explaining FIG. 7.

Upon non-use, as shown in FIGS. 7 and 8, the front portion of the cassette casing 1 is closed by the front lid 8 and the sliding member 9 biased by the coil spring 27 is slid forward. At that time, the reel brake member 11 is biased in the backward direction by the spring 25 and hence the brake nail members 11d, 11e thereof are engaged with the ratchet wheels of the reel hubs 4a, 4b so that the reel hubs 4a, 4b are locked so as not to rotate. Further, the reel shaft insertion apertures 5a, 5b of the cassette casing 1 and the reel shaft insertion corresponding apertures 9a, 9b formed through the sliding member 9 are displaced in position from each other and the cut-out portion 3a of the cassette casing 1 is closed by the sliding member 9 so that the magnetic tape 6 can be sufficiently closed tight, thus dust being prevented from adhering through the reel shaft insertion apertures 5a, 5b and the cut-out portion 3a to the magnetic tape 6, and fingers and the like being also prevented from touching the magnetic tape 6. Furthermore, the side plate portions 9d, 9e of the sliding member 9 are located beneath the arm portions 8a, 8b of the front lid 8 and the upper end surfaces of the side plate portions 9d, 9e of the sliding member 9 abut the lower end surfaces of the arm portions 8a, 8b of the front lid 8, whereby the front lid 8 can be locked so as not to rotate. As a result, upon non-use, the front lid 8 can be prevented from being rotated unintentionally. Accordingly, upon non-use, it can be avoided that the front lid 8 is rotated unintentionally to expose the magnetic tape 6 at the front portion of the cassette casing 1 and that the magnetic tape 6 is touched with the fingers or the like.

Figure 9:
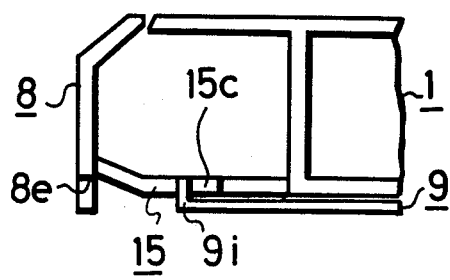
FIGS. 9, 10, 11 and 12 are respectively schematic diagrams useful for explaining the operation of the magnetic tape cassette shown in FIG. 3.
Figure 10:
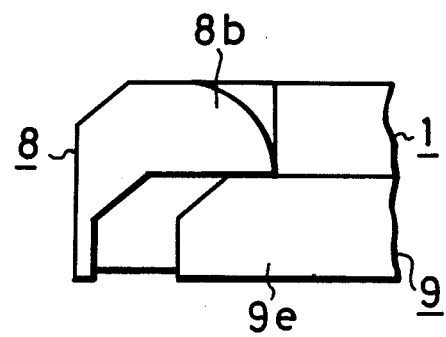

In addition, under this state, if the sliding member 9 is unintentionally moved backward against the biasing force of the tension coil spring 27 so as to open the cut-out portion 3a, when the sliding member 9 is moved to a position to open the substantially half of the cut-out portion 3a as shown in FIG. 9, the engaging piece memeber 9i of the sliding member 9 abuts against the protruded portion 15c of the engaging piece member 15 so that the sliding member 9 is restricted from slidably moving backward farther from this sliding position. At this sliding position of the sliding member 9, as shown in FIG. 10, the side plate portions 9d, 9e of the sliding member 9 still abuts against the arm portions 8a, 8b of the front lid 8 so that the front lid 8 is locked so as not to rotate. Accordingly, even if the sliding member 9 is slidably moved backward unintentionally upon non-use, the sliding movement of the sliding member 9 can be restricted by a simple construction at a position where the cut-out portion 3a is opened a little and the front lid 8 can be locked so as not to rotate unintentionally, thus the magnetic tape 6 is tightly shielded.

Figure 11:
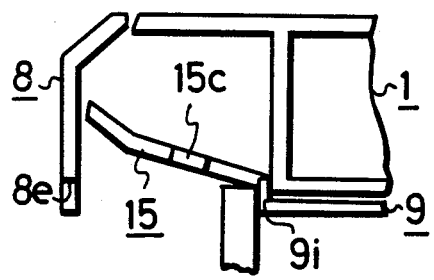

Upon use, the magnetic tape cassette is loaded on the recording and reproducing apparatus and then the releasing protrusions (not shown) and slider sliding nail members (not shown) of the recording and reproducing apparatus are pressedly made in contact with the engaging piece member 15 and the contact piece member 9j through the cut-away portions 8e and 8f of the front lid 8. At this time, as shown in FIG. 11, the engaging piece member 15 is bent by the releasing protrusion, which is passed through the cut-away portion 8e, so as to gradually move its slope portion 15a upwards so that the protruded portion 15c of the engaging piece member 15 is moved outside the movable range of the engaging member 9i of the sliding member 9 and also, the sliding member 9 is slidably moved backward by the slider sliding nail member (not shown) contacting with the contact piece member 9j. In this case, although the engaging member 9i is moved in the backward direction as the sliding member 9 is slidably moved backward, since the protruded portion 15c of the engaging piece member 15 is moved outside the movable range of the engaging member 9i, the engaging member 9i does not abut against the protruded portion 15c, and thus the slidable movement of the sliding member 9 in the backward direction is not restricted.

Figure 12:
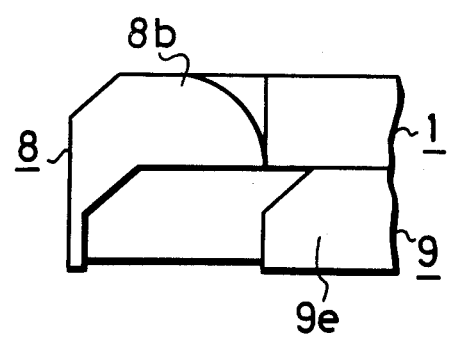
Figure 13:
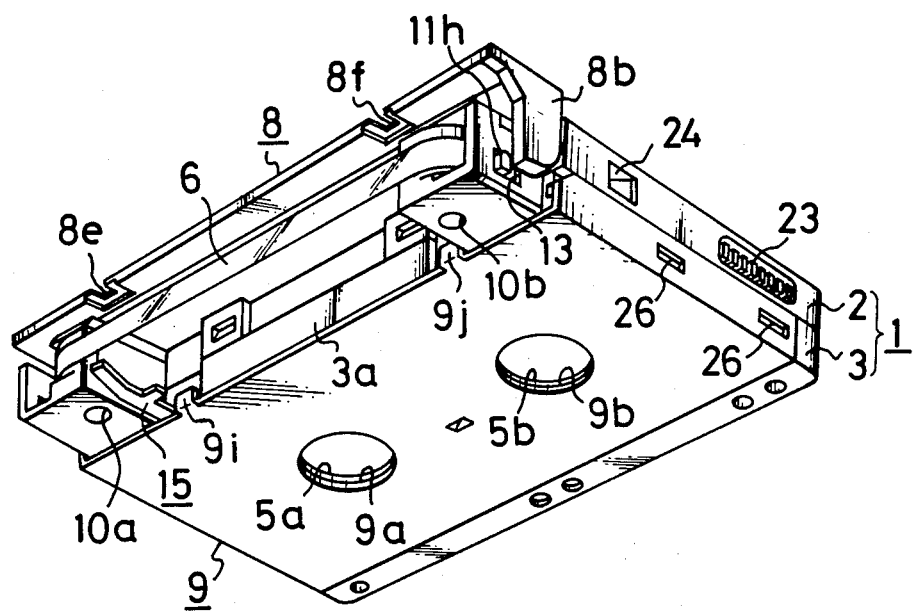
FIG. 13 is a perspective view showing the magnetic tape cassette of FIG. 3 upon use.
Figure 14:
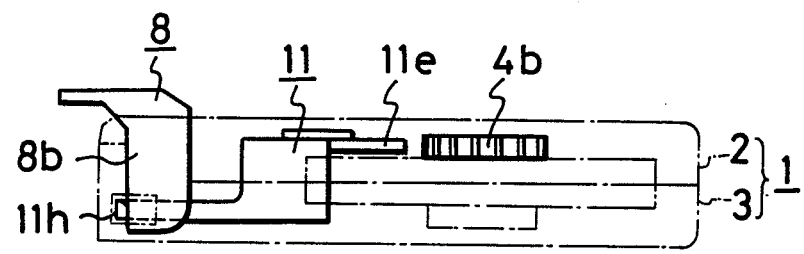
FIG. 14 is a schematic diagram useful for explaining FIG. 13.

As set forth above, since the sliding member 9 is slidably moved to the rearward predetermined position, as shown in FIG. 12, the side plate portions 9d, 9e of the sliding member 9 no longer abut against the arm portions 8a, 8b of the front lid 8, whereby the front lid 8 is permitted to rotate so as to open the front portion, and the cut-out portion 3a, the positioning apertures 10a, 10b and the reel shaft insertion apertures 5a, 5b are respectively opened. Then, from this state, the front lid 8 is rotated upward so as to open the front portion by a lid rotating member (not shown) of the recording and reproducing apparatus and the magnetic tape cassette is put into the state as shown in FIGS. 13 and 14.

In this case, when the front lid 8 is rotated upward, the operating members 11g, 11h of the reel brake member 11 are respectively pushed forward by the lower end portions of the arm portions 8a, 8b and hence the brake member 11 is slidably moved forward against the biasing force of the spring 25. At this time, the engagement between the brake nail members 11d, 11e of the brake member 11 and the ratchet wheels of the reel hubs 4a, 4b is released to enable the reel hubs 4a, 4b to rotate.

Under this state, the positioning protrusions and the reel shafts are respectively inserted into the positioning holes 10a, 10b and the reel shaft insertion apertures 5a, 5b, the magnetic tape 6 is exposed at the front portion of the cassette casing 1 and the tape guide system (not shown) is inserted into the cut-out portion 3a. Thus, the magnetic tape 6 is drawn forward by this type guide system and loaded onto the rotary drum of the recording and reproducing apparatus so as to carry out the predetermined recording (or playback).

When the operation mode of the magnetic tape cassette is changed from use mode to non-use mode contrary to the above, the operation opposite to the above operation will be carried out.

As mentioned above, in accordance with the magnetic tape cassette of this embodiment, the cassette casing 1 having formed at its predetermined position the cut-out portion 3a is provided with the rotatable front lid 8 and the cassette casing 1 is provided with the slidable sliding member 9, whereby the cut-out portion 3a is opened and/or closed by the front lid 8 and the sliding member 9 and the front lid 8 is locked by the sliding member 9 so as not to rotate. In this magnetic tape cassette, since the engaging piece member 15 is formed near the cut-out portion 3a of the cassette casing 1 and the engaging member 9i is formed on the sliding member 9 in association with this engaging piece member 15, whereby the sliding movement of the sliding member 9 relative to the cassette casing 1 is restricted by the engagement of the engaging piece member 15 with the engaging member 9i, there is then an advantage that upon non-use, the front lid 8 can be prevented from being rotated by the simple construction and simple operation so as not to open the front portion.

While in the above embodiment, the single engaging piece member 15 is provided, it will easily be understood that other engaging piece members may be provided at the position symmetrical to that of the engaging piece member 15 with the similar action and effect to those of this embodiment being achieved.

Figure 16:
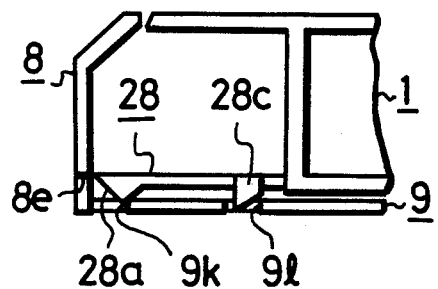
FIGS. 16 and 17 are respectively schematic diagrams useful for explaining the operation of the magnetic tape cassette shown in FIG. 15.
Figure 17:
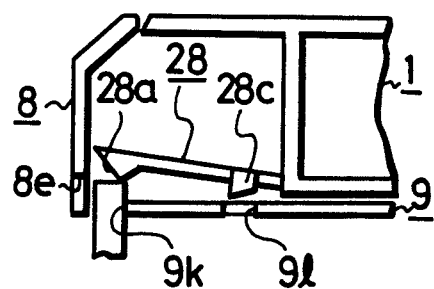
Figure 15:
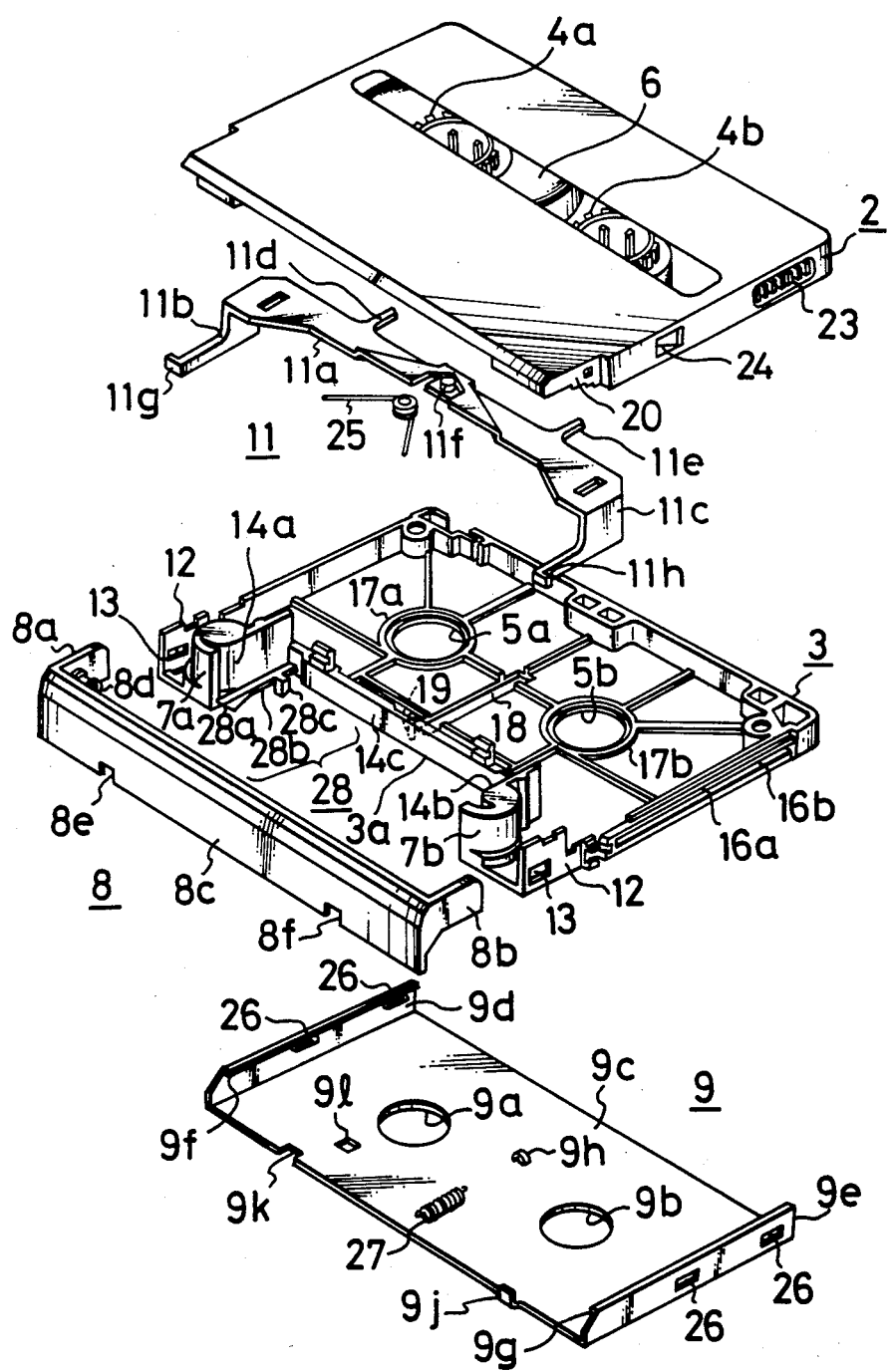
FIG. 15 is an exploded perspective view showing another embodiment of the magnetic tape cassette according to the present invention.

FIGS. 15 to 17 illustrate another embodiment of the magnetic tape cassette according to the present invention. In FIGS. 15 to 17, like parts corresponding to those in FIGS. 3 to 14 are marked with the same references and will not be described in detail.

In this embodiment, as shown in FIG. 15, an engaging piece member 28 is formed of a plate portion 28b having a slope portion 28a on its lower surface and at its tip end portion and a lock nail member 28c located at the intermediate position of the plate portion 28b in the front and rear direction which will be engaged with a lock aperture of the sliding member 9 which will be described later to become substantially T-shaped as viewed from the horizontal direction.

In correspondence with the slope portion 28a of the engaging piece member 28 which is under the condition that when the sliding member 9 is slidably moved forward so as to close the cut-out portion 3a, the front edge portion of the sliding member 9 is cut away in U-shape to form a lock releasing cut-out 9k and in correspondence with the lock nail member 28c of the engaging piece member 28 which is under the condition that when the sliding member 9 is slidably moved forward so as to close the cut-out portion 3a, a lock aperture 9l of rectangular shape is formed through the sliding member 9. The other portions are formed similarly to those of the magnetic tape cassette shown in FIGS. 3 to 14.

According to the construction thus made, upon non-use, under the condition that the front lid 8 closes the front portion and the sliding member 9 closes the cut-out portion 3a, the arm portions 8a, 8b of the front lid 8 abut against the side plate portions 9d, 9e of the sliding member 9 so that the front lid 8 is locked by the sliding member 9 so as not to rotate. Further, under this state, as shown in FIG. 16, the lock nail member 28c of the engaging piece member 28 is engaged with the lock aperture 9l of the sliding member 9 so that the sliding member 9 is locked so as not to be moved slidably in the backward direction. Accordingly, upon non-use, even if the sliding member 9 is slidably moved so as to unintentionally open the cut-out portion 3a and the front lid 8 is unintentionally rotated so as to open the front portion of the cassette casing 1, the rotation of the front lid 8 is locked by the sliding member 9 and the sliding movement of the sliding member 9 can be locked by the engaging piece member 28, thus upon non-use, the magnetic tape 6 is tightly shielded satisfactorily within the cassette casing 1.

Upon use, when the releasing protrusion (not shown) of the recording and reproducing apparatus is abutted against the slope portion 28a of the engaging piece member 28, as shown in FIG. 17, the engaging piece member 28 is bent upward to release the engagement between the lock nail member 28c of the engaging piece member 28 and the lock aperture 9l of the sliding member 9 so that the sliding member 9 can be slidably moved backward so as to open the cut-out portion 3a.

As described above, according to the magnetic tape cassette of this embodiment, it will be easily understood that the same action and effect as those in the magnetic tape cassette shown in FIGS. 3 to 14 can be achieved.

According to the magnetic tape cassette of the present invention having formed at its predetermined position the cut-out pottion which is provided with the rotatable front lid and with the slidable sliding member, the cut-out portion is opened and/or closed by the front lid and the sliding member and the rotation of the front lid is locked by the sliding member. In this case, since the engaging piece member is formed near the cut-out portion of the cassette casing and the engaging portion is formed on the sliding member in association with this engaging piece member, whereby the sliding movement of the sliding member relative to the cassette casing is restricted by the engagement between the engaging piece member and the engaging portion, it is possible to obtain the magnetic tape cassette with a simple construction which can prevent the front lid from being rotated so as not to open the front portion by a simple operation.

The above description is given on the preferred embodiments of the invention, but it will be apparent that many modifications and variations could be effected by one skilled in the art without departing from the spirits or scope of the novel concepts of the invention, so that the scope of the invention should be determined by the appended claims only.

We claim as our invention:

1. A magnetic tape cassette comprising:

(a) a cassette casing having incorporated therein a pair of reel hubs around which a magnetic tape is wound;

(b) a rotatable front lid provided at a front portion of said cassette casing and covering an opening formed through said front portion of said cassette casing; and (c) a sliding plate provided at one surface of said cassette casing so as to be freely slidable in the front and rear direction, wherein when said sliding plate is slidably moved to a first sliding position, a pair of reel shaft insertion apertures into which said pair of reel hubs are rotatably inserted and a cut-out portion for drawing out said magnetic tape are exposed, while when said sliding plate is slidably moved to a second sliding position, said reel shaft insertion apertures and said cut-out portion are closed by said sliding plate, said front lid having at its both side end portions arm portions having rotary shafts, in which when said sliding plate is slid to said second sliding position, a closed state of said front openable and closable lid is restricted by the cooperation of a front end portion of said sliding plate with said arm portions;

(d) an elastic engaging portion extended to a front portion of said cut-out portion of said cassette casing and having an elastic protruding piece member at its tip end, and;

(e) an engaging aperture formed through said sliding plate with which said protruding engaging piece member is engaged under the state that said cut-out portion is closed by said sliding plate, whereby to restrict the sliding movement of said sliding plate.

2. A magnetic tape cassette according to claim 1, wherein said engaging piece member is provided at its extension with an engage releasing piece member, whereby when said engage releasing piece member is operated from the outside, the engagement between said protruding engaging piece member and said engaging aperture of said sliding plate is released.

3. A magnetic tape cassette according to claim 1, further comprising a biasing means provided in association with said sliding plate and said cassette casing for biasing said sliding plate to the direction to close said reel shaft insertion apertures and said cut-out portion.

* * * * *